(12) United States Patent
Lässig et al.

(10) Patent No.: US 8,801,067 B2
(45) Date of Patent: Aug. 12, 2014

(54) GRIPPER FOR GRASPING AN OPHTHALMIC LENS IMMERSED IN A LIQUID

(75) Inventors: Günter Lässig, Obernburg (DE); Roger Biel, Aschaffenburg (DE); Karsten Straube, Lutherstadt Wittenberg (DE)

(73) Assignee: Novartis AG, Basel (CH)

( * ) Notice: Subject to any disclaimer, the term of this patent is extended or adjusted under 35 U.S.C. 154(b) by 263 days.

(21) Appl. No.: 13/299,147

(22) Filed: Nov. 17, 2011

(65) Prior Publication Data

US 2012/0126558 A1 May 24, 2012

Related U.S. Application Data

(60) Provisional application No. 61/415,422, filed on Nov. 19, 2010.

(51) Int. Cl.
*B25J 15/06* (2006.01)
(52) U.S. Cl.
USPC .......................................... 294/183; 294/186
(58) Field of Classification Search
USPC ................ 294/1.2, 183, 185, 186, 188, 64.3;
206/1.5, 210; 134/184, 186, 137;
53/432; 901/40; 269/21
See application file for complete search history.

(56) References Cited

U.S. PATENT DOCUMENTS

| | | | |
|---|---|---|---|
| 4,721,124 A * | 1/1988 | Tuerkheimer et al. | 134/138 |
| 5,316,700 A * | 5/1994 | Soye et al. | 249/82 |
| 6,502,876 B1 | 1/2003 | Stockhorst | |
| 6,811,398 B2 * | 11/2004 | Bennett | 433/25 |
| 6,994,386 B2 | 2/2006 | Hagmann | |
| 7,887,111 B2 | 2/2011 | Hagmann | |
| 8,387,782 B2 * | 3/2013 | Biel et al. | 206/1.5 |
| 2002/0149744 A1 * | 10/2002 | Biel et al. | 351/177 |
| 2007/0000801 A1 | 1/2007 | Mauran | |
| 2009/0219517 A1 * | 9/2009 | Lassig et al. | 356/124 |
| 2011/0058927 A1 | 3/2011 | Biel | |
| 2011/0089053 A1 * | 4/2011 | Biel et al. | 206/5.1 |

FOREIGN PATENT DOCUMENTS

WO  2009103732 A1  8/2009

OTHER PUBLICATIONS

PCT International Search Report dated Feb. 10, 2012, International Application No. PCT/EP2011/070308, Filing Date Nov. 17, 2012.
PCT Written Opinion of the International Searching Authority dated Feb. 10, 2012, International Application No. PCT/EP2011/070308, Filing Date Nov. 17, 2012.

\* cited by examiner

*Primary Examiner* — Paul T Chin
(74) *Attorney, Agent, or Firm* — Robert Ambrose

(57) ABSTRACT

A gripper for grasping an ophthalmic lens immersed in a liquid, for example a contact lens or soft contact lens, the gripper including a housing having an opening arranged at the distal end of the housing, the opening being in communication with an interior space defined by the housing and being sized to allow the ophthalmic lens to pass therethrough; a supply channel to generate suction in the interior space of the housing to allow the ophthalmic lens together with an amount of the liquid in which the ophthalmic lens is immersed to be sucked through the opening into the interior space of the housing; and a supply channel for generating overpressure in the interior space of the housing so as to allow the ophthalmic lens together with the amount of liquid to be released from the interior space through the opening at the distal end of the housing.

15 Claims, 4 Drawing Sheets

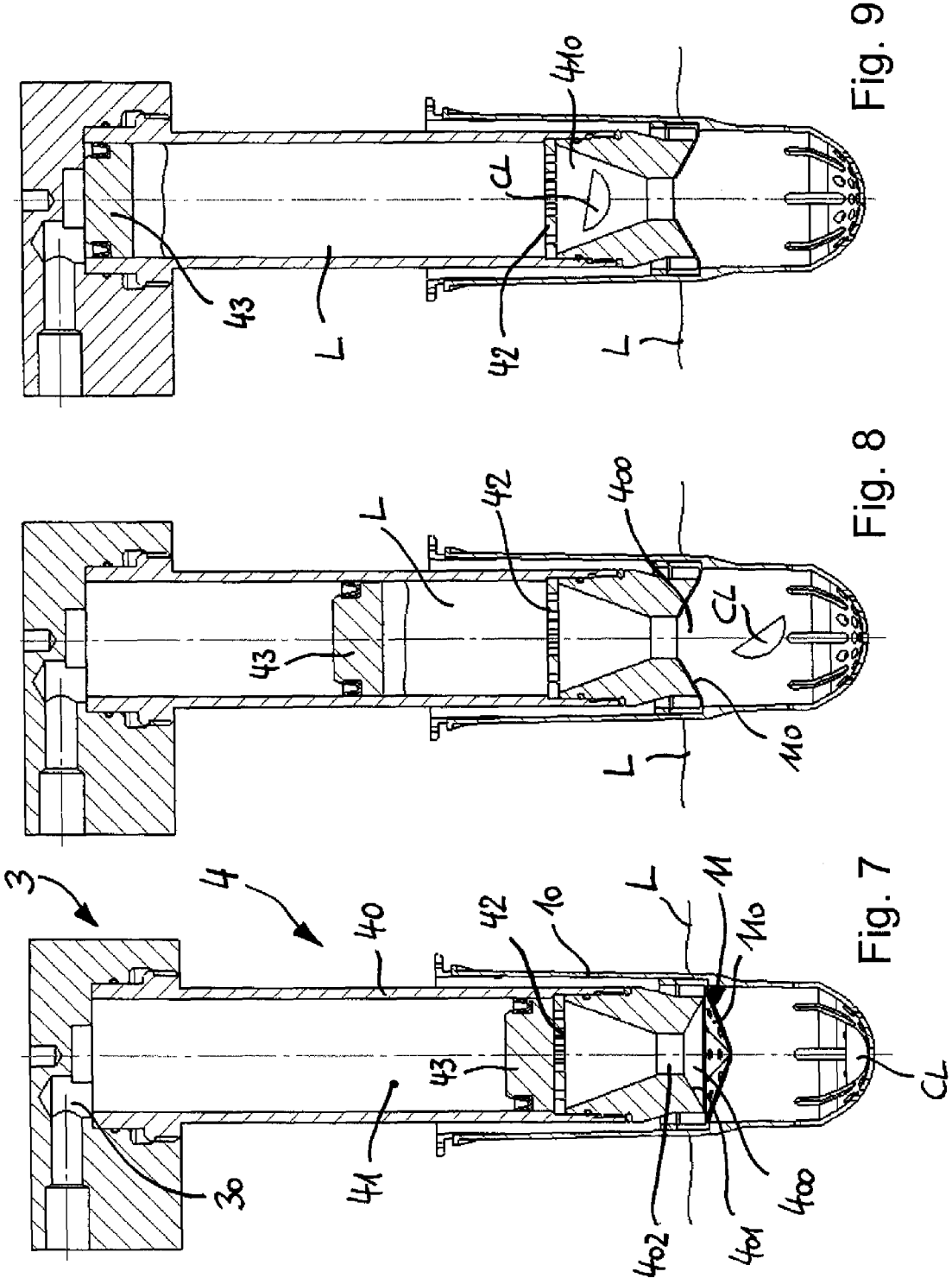

GRIPPER FOR GRASPING AN OPHTHALMIC LENS IMMERSED IN A LIQUID

This application claims the benefit under 35 USC §119(e) of U.S. provisional application Ser. No. 61/415,422 filed on Nov. 19, 2010, incorporated herein by reference in its entirety.

FIELD

The invention relates to a gripper and a method for grasping an ophthalmic lens immersed in a liquid.

BACKGROUND

It is well-established to manufacture ophthalmic lenses, and in particular contact lenses such as soft contact lenses, in a fully automated manufacturing process. In such a process, the contact lenses are typically molded by polymerizing and/or crosslinking a starting material so as to form the contact lens. Depending on the starting material used, it may be required or desired to place the lens in one or more treatment liquids, such as an extraction liquids, rinsing liquids and/or coating liquids. To achieve this, the lenses may be placed into containers which may be transported through one or more liquid baths. The containers may comprise a tubular body having openings in the tubular body. The openings in the tubular body of the container ensures that liquid is contained in the inner space of the tubular body of the container so that the lens is immersed in liquid during its transport through the one or more baths and is in contact with the respective treatment liquid. One embodiment of such container comprises a diaphragm having flexible fins extending from the tubular body towards the central axis of the container. This diaphragm having the flexible fins ensures that the lens is retained in the respective container during the transport of the container through the baths and thus prevents the lens from getting lost in one of the baths which may otherwise occur due to liquid flow generated by the movement of the containers through the baths.

Once the treatment of the lenses is finished, the lenses must be removed from the treatment liquid and transported to subsequent processing stations, e.g. inspections station, packaging stations, etc. Removing the lens from the treatment liquid is typically performed with the aid of a gripper having an outer distal end face having openings therein allowing a lens to be sucked against the distal end face of the gripper with the aid of a vacuum applied through the interior space of the gripper. For that purpose, the gripper is introduced into the liquid to a position close to the lens to be grasped and then the vacuum is applied through the interior of the gripper and through the openings in the distal end face of the gripper resulting in the lens being sucked against the distal (typically convex) end face. The gripper together with the lens attached to the distal end face is then removed from the liquid and the lens is transported to a destination location where it is released from the distal end face with the aid of overpressure applied through the interior space and through the openings in the distal end face of the gripper.

While this way of grasping and removing a lens from a liquid is known as being reliable, there is still room for improvement. For example, the vacuum applied through the interior of the gripper which causes lens to be sucked against the distal end face of the gripper is maintained during removal and transport of the gripper with the lens adhered to the distal end face. This vacuum may cause the lens to at least partly dry out which may damage the lens or render the lens useless. And in some instances, it may cause the lens to strongly adhere to the distal end face so that it is not reliably released therefrom upon the application of overpressure through the interior space and through the openings in the distal end face of the gripper.

Accordingly, it is an object of the invention to provide a gripper for grasping an ophthalmic lens immersed in a liquid, in particular a contact lens such as a soft contact lens, which does not have the above-mentioned drawbacks of conventional grippers. The gripper should be capable of reliably grasping the ophthalmic lens, retaining it during removal of the gripper from the liquid and during transport of the gripper to the destination location where the lens is to be released from the gripper. In particular, the grasped lens is to be handled carefully during grasping and transport and drying-out of the lens should be prevented. In addition, the gripper should be capable of being used in mass production of ophthalmic lenses such as soft contact lenses. Preferably, the gripper should be capable of removing the lens from each type of container, but in particular from a container of the type comprising the tubular body and the fins extending from the tubular body towards the central axis of the tubular body.

SUMMARY

These and other objects are met by a gripper and a method for grasping an ophthalmic lens, for example a soft contact lens, immersed in a liquid as they are specified in the respective independent claim. Advantageous embodiments of the gripper and method according to the invention are the subject of the dependent claims.

Accordingly, one aspect is related to a gripper for grasping an ophthalmic lens immersed in a liquid, in particular for a contact lens such as a soft contact lens, the gripper including:
  a housing having an opening arranged at the distal end of the housing, the opening being in communication with an interior space defined by the housing and being sized to allow the ophthalmic lens to pass therethrough,
  a supply channel for generating underpressure in the interior space of the housing to allow the ophthalmic lens together with an amount of the liquid in which the ophthalmic lens is immersed to be sucked through the opening into the interior space of the housing, and
  a supply channel for generating overpressure in the interior space of the housing so as to allow the ophthalmic lens together with the amount of liquid to be released from the interior space through the opening at the distal end of the housing.

In contrast to prior art grippers, the lens is not sucked against a distal end surface of the gripper but rather it is sucked into the interior space of the housing together with an amount of liquid in which the lens is immersed. Once sucked into the interior space of the housing of the gripper, the lens remains immersed in the amount of liquid sucked into the interior space of the housing together with the lens. Accordingly, the lens is reliably prevented from drying out during grasping and transport. In addition, the lens cannot strongly adhere to a distal end surface of the gripper since there is no such surface. Rather, once the gripper has transported the lens to the destination location the lens—together with the liquid—can be carefully released from the interior space of the housing by generating an overpressure in the interior space of the housing causing the lens to be released through the opening at the distal end of the housing which is of a size that allows the lens to pass therethrough.

In one embodiment of the gripper the suction (underpressure) and positive pressure (overpressure) may be supplied or generated by supply channel(s) for supplying underpressure or overpressure, respectively, the supply channel(s) being in communication with the interior space of the housing at a proximal end portion of the housing. The supply channel for supplying underpressure and the supply channel for supplying overpressure can be separate channels. Alternatively, the supply channel for supplying the underpressure and the supply channel for supplying the overpressure together may form a common supply channel for supplying the underpressure or the overpressure through the common supply channel.

The underpressure supplied through the supply channel to the interior space of the housing at the proximal end portion thereof may either directly form the suction (underpressure) causing the lens and an amount of liquid to be sucked into the interior space of the housing through the opening at the distal end thereof. This may hold, too, for the supplied overpressure or positive pressure which may directly form the positive pressure causing the lens and the liquid to be released from the interior space of the housing through the opening at the distal end.

In a further embodiment of the gripper, the suction (underpressure) and positive pressure (overpressure) may be supplied or generated by a piston movably arranged in the interior space of the housing between a distal end position of the piston and a proximal end position of the piston. In this embodiment, the suction for sucking the lens and the liquid through the opening at the distal end into the interior space of the housing may be generated through movement of the piston towards the proximal end position. Similarly, the positive pressure for releasing the lens from the interior space through the opening at the distal end of the housing may be generated through movement of the piston towards the distal end position.

In a still further embodiment of the gripper, the supply channel for supplying the underpressure and the supply channel for supplying the overpressure, or the common supply channel, respectively, are arranged to allow the underpressure or the overpressure to be supplied to the interior space of the housing at a location proximal to the proximal end position of the piston, so as to allow the piston to be moved towards its proximal end position upon supplying underpressure to cause the piston to generate the suction in the interior space of the housing and to allow the piston to be moved towards its distal end position upon supplying overpressure to cause the piston to generate the positive pressure in the interior space of the housing. The supplied underpressure causes the piston to move towards the proximal end position thus generating the suction sucking the lens and the liquid through the opening at the distal end portion into the interior of the housing. Similarly, the overpressure causes the piston to move in the opposite direction, i.e. towards the distal end position, thus generating the positive pressure releasing the lens from the interior of the housing through the opening at the distal end.

A further embodiment of the gripper comprises a screen or mesh material arranged in the interior space of the housing, the screen being arranged to retain the ophthalmic lens in the interior space of the housing on that side of the screen facing the opening at the distal end of the housing. The screen retains the lens in a distal portion of the interior space between the screen and the opening so that the lens is not sucked further into the interior space. At the time of releasing the lens, the lens is reliably released together with the liquid that has been sucked into the interior space since the lens is located in the distal portion of the interior space beneath the screen.

In a further embodiment of the gripper, the housing at its distal end has a conical outer shape tapering towards the distal end. This embodiment is particularly advantageous in connection with the described container comprising the tubular body and the diaphragm having the flexible fins extending from the body towards the central axis of the tubular body. At the time a lens arranged in such container and immersed in the liquid of the respective bath is to be removed, the gripper is moved into the interior space of the tubular body such that the distal end of the housing of the gripper penetrates the diaphragm, flexes the fins away and makes the flexible fins rest against the conically shaped distal end of the housing. The distal opening of the gripper is then arranged beneath the diaphragm in the liquid in the same volume where the lens is located in the container. Upon generating suction in the interior space of the housing of the gripper (either directly or with the aid of the piston, depending on the embodiment of the gripper) the lens together with an amount of liquid in which the lens is immersed is sucked through the opening at the distal end into the interior space of the gripper. Once the lens has been sucked into the interior of the gripper, the suction is maintained so that neither the lens nor the liquid sucked into the interior of the gripper may escape from the interior space of the gripper. Rather, in the embodiment comprising the screen or mesh material, the lens is retained in liquid beneath the mesh. The gripper together with the lens and the liquid is then removed from the container and moved to the destination location. Thus, the lens is transported to the destination location in liquid so that it cannot dry out. At the destination location, e.g. at the location where the lens is to be placed into an inspection cuvette, the suction is terminated and positive pressure is generated in the interior space of the housing (either directly or with the aid of the piston, depending on the embodiment of the gripper) causing the lens and the liquid to be released from the interior space of the gripper. By way of example, the lens and the liquid may be introduced into an afore-mentioned inspection cuvette to subsequently allow inspection of the lens.

Alternatively, in another embodiment of the gripper the opening at the distal end of the housing comprises a conically inwardly tapering portion. Using this embodiment of the gripper, the distal end of the gripper is moved into the liquid in the afore-described container to a position close to the diaphragm but above the diaphragm, so that it does not penetrate the diaphragm. Suction is then generated in the interior space of the housing (either directly or with the aid of the piston, depending on the embodiment of the gripper) to flex the fins and make them rest against the conically inwardly tapering portion of the opening, so that the diaphragm does no longer form a barrier for the lens, that is to say the opening at the distal end of the gripper is then cleared. The suction does not only make the fins rest against the conically inwardly tapering portion of the opening, it also causes the lens to be sucked through the opening into the interior space of the gripper. Transport and release of the lens in the liquid may then be performed in the manner described above.

Another aspect of the invention relates to a method for grasping an ophthalmic lens immersed in a liquid, in particular a contact lens such as a soft contact lens, the method comprising the steps of:

providing a gripper comprising a housing having an opening arranged at the distal end of the housing, the opening being in communication with an interior space defined by the housing and being sized to allow the ophthalmic lens to pass therethrough, generating underpressure in the interior space of the housing causing the ophthalmic lens together with an amount of the liquid in which the ophthalmic lens is immersed to be sucked through the opening into the interior space of the housing, and generating overpressure in the interior space of the housing causing the ophthalmic lens together with the amount of liquid to be released from the interior space through the opening at the distal end of the housing.

The advantages of the method and of the various embodiments thereof correspond to those already discussed above in connection with the gripper and the various embodiments. Accordingly, while in the following some of the embodiments of the method are explicitly mentioned, the advantages of the corresponding embodiment of the gripper are not reiterated.

One embodiment of the method further comprises the step of supplying underpressure or overpressure, respectively, to a proximal end portion of the interior space of the housing to generate the suction or the positive pressure, respectively.

In a further embodiment of the method according to the invention, the step of providing a gripper comprises providing a gripper having a piston movably arranged in the interior space of the housing between a distal end position of the piston and a proximal end position of the piston. The step of generating suction in the interior of the housing comprises moving the piston towards its proximal end position, and the step of generating positive pressure in the interior of the housing comprises moving of the piston towards its distal end position.

In a still further embodiment of the method according to the invention, supplying underpressure to the proximal end portion of the interior space of the housing causes the piston to move towards its proximal end position, whereas supplying overpressure to the proximal end portion of the interior space of the housing causes the piston to move towards its distal end position.

In a yet further embodiment of the method according to the invention, the step of providing a gripper comprises providing a gripper having a screen or mesh material arranged in the interior space of the housing to retain the ophthalmic lens in the interior space of the housing on that side of the screen facing the opening at the distal end of the housing.

In a still further embodiment of the method according to the invention, the ophthalmic lens is arranged in the liquid in a container having an elongated tubular body. The container comprises a diaphragm having flexible fins extending from the tubular body towards the central axis of the body to retain the ophthalmic lens in the container. The housing of the gripper at its distal end has a conical outer shape tapering towards the distal end. The method further comprises moving the distal end of the gripper through the diaphragm to flex the fins away and make them rest against the conically shaped distal end of the housing prior to generating suction in the interior space of the housing.

In a yet further embodiment of the method according to the invention, the ophthalmic lens is arranged in the liquid in a container having an elongated tubular body. The container comprises a diaphragm having flexible fins extending from the tubular body towards the central axis of the body. The opening at the distal end of the gripper comprises a conically inwardly tapering portion. The method further comprises moving the distal end of the gripper into the liquid in the container to a position close to the diaphragm and then generating the suction in the interior space of the housing to flex the fins and make them rest against the conically inwardly tapering portion to allow the lens to be sucked through the opening into the interior space of the housing.

BRIEF DESCRIPTION OF THE DRAWINGS

Further advantageous embodiments and aspects of the invention become apparent from the following description of embodiments of the invention with the aid of the drawings, in which.

DETAILED DESCRIPTION OF EMBODIMENTS

Figure 1:
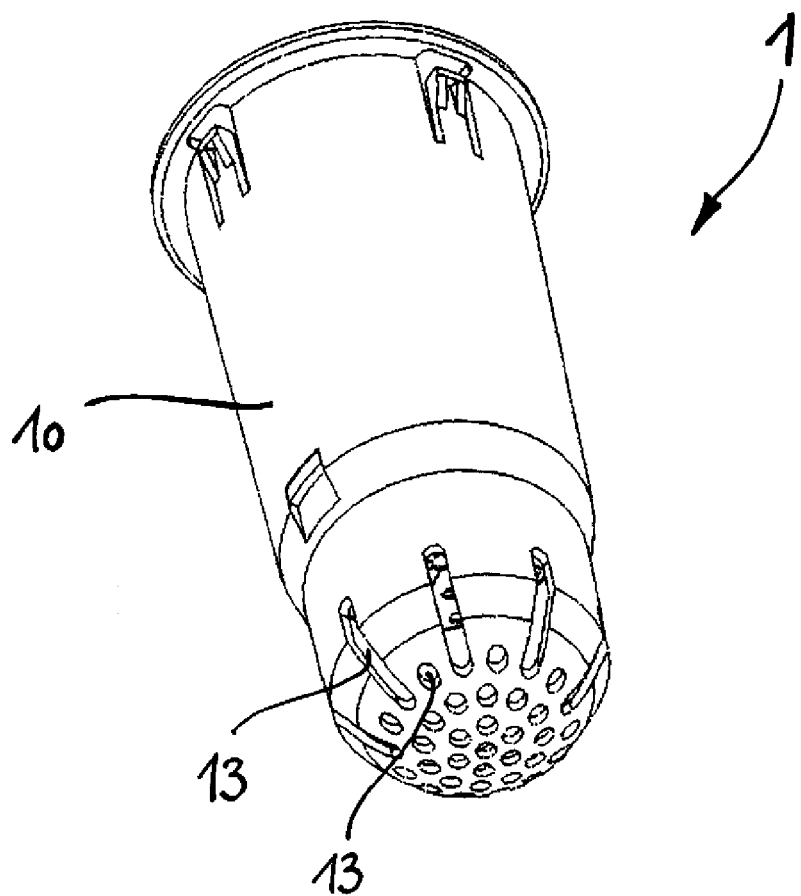
FIG. 1 a perspective view of an embodiment of a container for transporting a lens through a bath, FIG. 2 the container shown in FIG. 1 in a perspective view from above, FIG. 3 the container shown in FIG. 1 and FIG. 2 in a cross-sectional view, FIG. 4 a first embodiment of the gripper arranged in a container as shown in FIGS. 1-3, the piston of the gripper being in a distal end position, FIG. 5 the gripper of FIG. 4 arranged in the container, the piston being in an intermediate position, FIG. 6 the gripper of FIG. 4 arranged in the container, the piston being in a proximal end position, FIG. 7 a second embodiment of the gripper arranged in a container as shown in FIGS. 1-3, the piston of the gripper being in a distal end position, FIG. 8 the gripper of FIG. 7 arranged in the container, the piston being in an intermediate position, and FIG. 9 the gripper of FIG. 7 arranged in the container, the piston being in a proximal end position.
Figure 2:
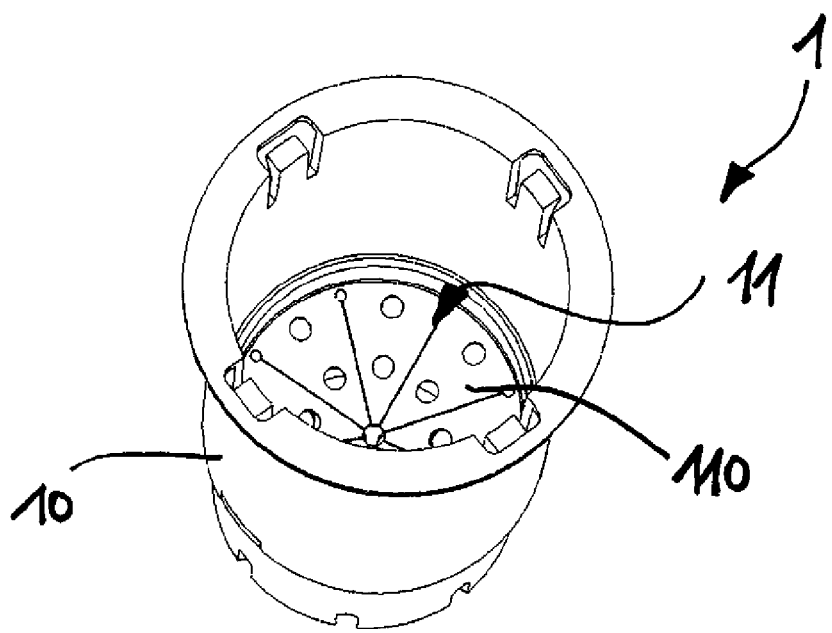
Figure 3:
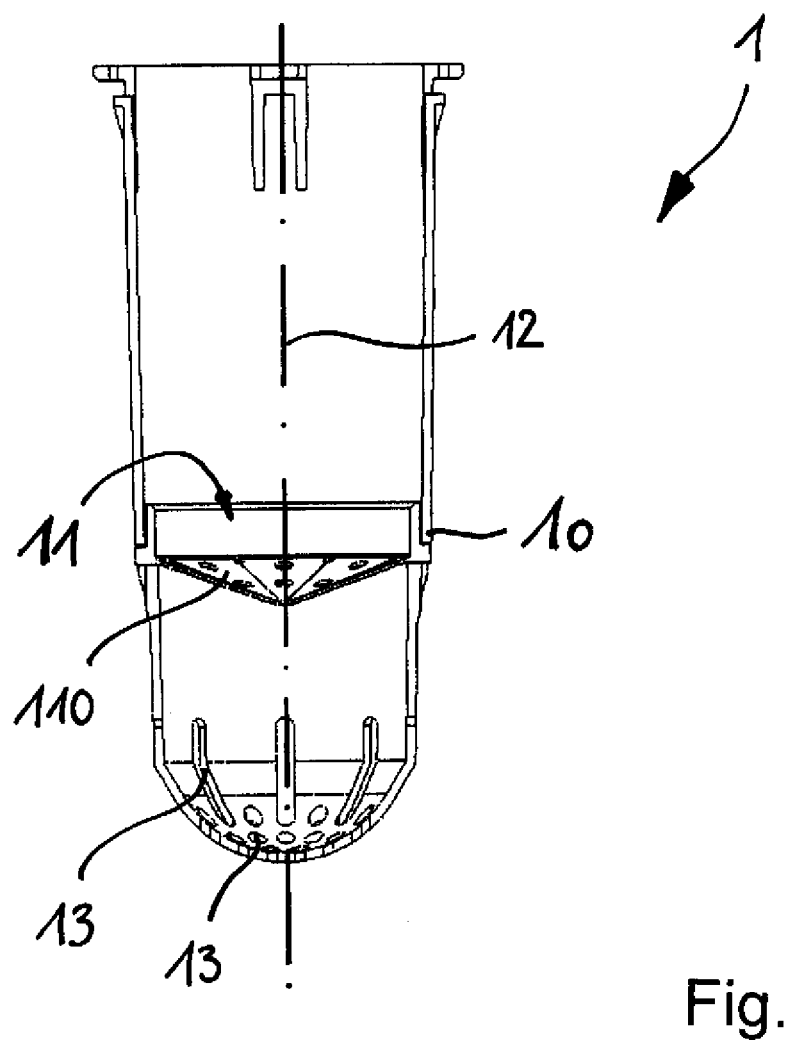

FIGS. 1-3 show a container 1 for transporting a lens, e.g. a soft contact lens, through a bath. The bath may serve for extraction, rinsing and/or coating of the lens, or may serve any other suitable purpose. Container 1 comprises a tubular body 10 in the interior space of which a diaphragm 11 is arranged. Diaphragm 11 comprises flexible fins 110 extending inwardly from the tubular body 10 towards a central axis 12 of the tubular body 10. Container 1 further comprises openings 13 in the form of holes and/or slits allowing liquid to pass into and out of the interior space of container 1. As the contact lens (not shown in FIGS. 1-3) is transported through the liquid of the one or more baths, the lens is immersed in the liquid that has penetrated into the interior space of container 1. Depending on the type of movement the container is subjected to (sidewards, up and down, combinations thereof, etc.), a flow of liquid is generated in the interior space of container 1. This may result in an uncontrolled movement of the contact lens. In order to retain the contact lens in a distal end portion of container 1, diaphragm 11 comprises the fins 110 which prevent the contact lens from moving to a proximal portion of container 1 or even out of container 1. Once the lens has been transported through the one or more baths containing the liquid or liquids, respectively, the contact lens must be removed from container 1. To achieve this, container 1 is arranged at a removal position allowing the contact lens to settle down.

Figure 6:
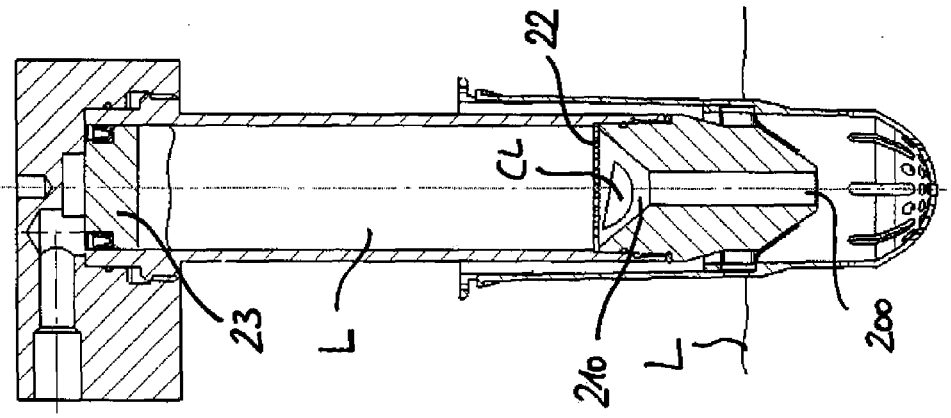
Figure 5:
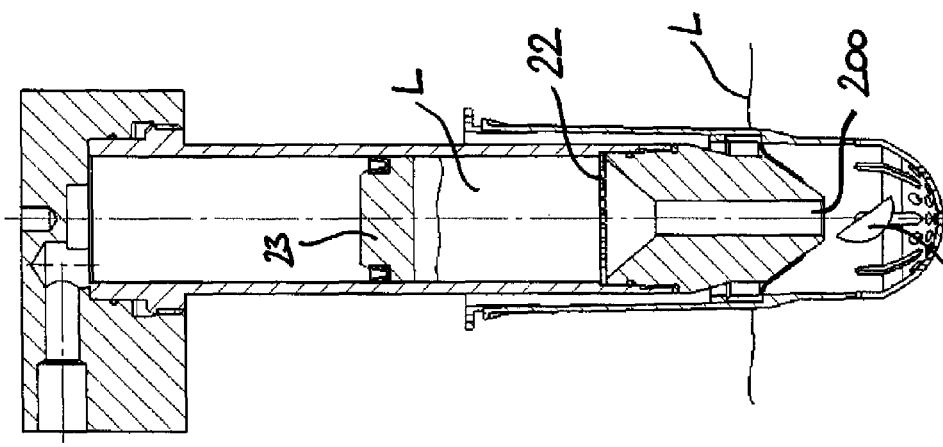
Figure 4:
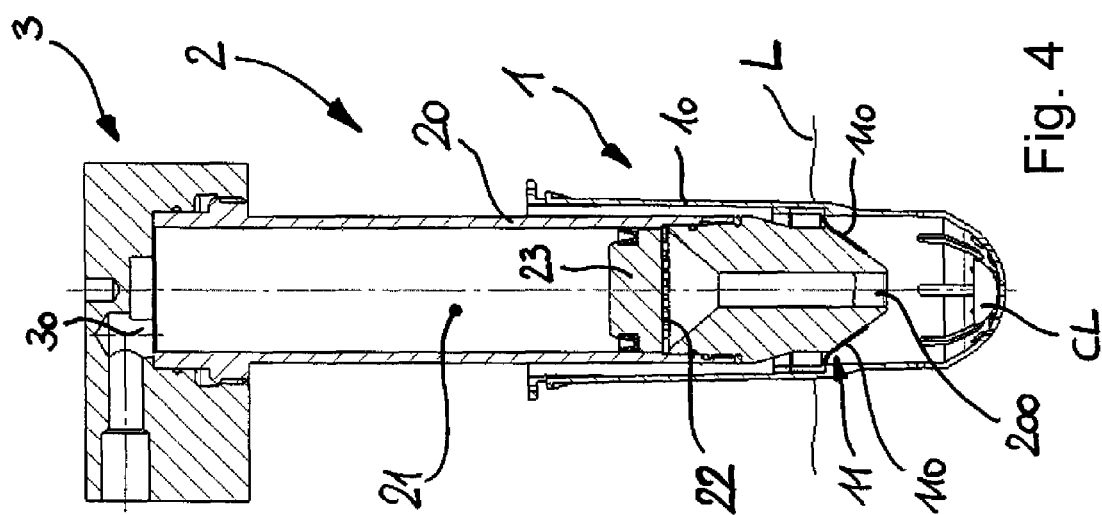

FIGS. 4-6 show a first embodiment of the gripper 2 according to the invention, the gripper 2 being arranged in a position in which it has penetrated diaphragm 11 of container 1. Gripper 2 has a housing 20 having a conically shaped portion tapering towards the distal end of the housing 20. The conically shaped portion of housing 20 has flexed the fins 110 away so as to make the fins 110 rest against the outer walls of that conically shaped portion. An opening 200 at the distal end of housing 20 of gripper 2 is arranged in the volume of liquid L where contact lens CL is also immersed. In the embodiment of gripper 2 shown in FIGS. 4-6, opening 200 has a cylindrical shape and communicates with an interior space 21 of the housing 20. In the interior space 21 of housing 20 a screen 22 is arranged in a distal portion of the interior space 21. Also, a piston 23 is movably arranged in the interior space 21, the piston being movable between a distal end position (see FIG. 4) and a proximal end position (see FIG. 6). The proximal end of housing 20 is connected to a supply unit 3 comprising a common supply channel 30 through which underpressure or overpressure can be supplied to the interior space 21 of housing 20.

To grasp contact lens CL, underpressure is supplied through channel 30 to the interior space 21 of housing 20. Piston 23 is tightly arranged within housing 20 of gripper 2, so that the supplied underpressure causes movement of piston 23 from its distal end position (FIG. 4) to an intermediate position (FIG. 5) and finally to its proximal end position (FIG. 6). Movement of piston 23 from its distal end position to the intermediate position and finally to its proximal end position causes suction to be generated in that portion of the interior space 21 located beneath piston 23. This suction causes the contact lens CL together with an amount of liquid L to be sucked from the container 1 through opening 200 into the interior space 21 of housing 20, as this becomes evident from FIGS. 4-6. However, screen 22 makes sure that the contact lens CL is retained beneath screen 22, that is to say in a partial space 210 of the interior space 21 of housing 20, that partial space 210 being arranged between screen 22 and opening 200.

As piston 23 has reached its proximal end position (FIG. 6), the gripper is removed from container 1 (not shown) with the underpressure being maintained, so that contact lens CL remains within the partial space 210 and immersed in liquid L. The gripper 2 can then be moved to the destination location, e.g. to a location where an inspection cuvette is arranged. Having reached its destination location, the underpressure is no longer maintained but overpressure is applied through common supply channel 30 instead. This causes piston 23 to move from its proximal end position (FIG. 6) towards its distal end position (FIG. 4). This movement of piston 23 causes positive pressure to be generated in partial space 210 resulting in that contact lens CL together with the liquid being released from the interior space 21, or from the partial space 210, respectively, through opening 200 at the distal end of housing 20. For example, contact lens CL together with the liquid L, which may be water or any other suitable liquid, is introduced into the inspection cuvette (not shown) for subsequent inspection of the contact lens CL.

FIGS. 7-9 show a second embodiment of the gripper 4 according to the invention, the gripper 4 being arranged in a position in which it has not penetrated diaphragm 11 of container 1. However this distal end of gripper 4 is arranged immediately above diaphragm 11. Gripper 4 comprises a housing 40 having an opening 400 at the distal end portion of housing 40, this opening 400 comprising a conically inwardly tapering portion 401. The opening 400 at the distal end of housing 40 of gripper 4 is arranged in the volume of liquid L where contact lens CL is also immersed. In the embodiment of gripper 4 shown in FIGS. 7-9, the opening 400 has a conically inwardly tapering portion 401 which is followed by a cylindrical portion 402 and communicates with an interior space 41 of the housing 40. In the interior space 41 of housing 40 a screen 42 is arranged in a distal portion of the interior space 41. Also, a piston 43 is movably arranged in the interior space 41, the piston being movable between a distal end position (FIG. 7) and a proximal end position (FIG. 9). The proximal end of housing 40 is connected to a supply unit 3 comprising a common supply channel 30 through which underpressure or overpressure can be supplied to the interior space 41 of housing 40.

To grasp contact lens CL, underpressure is again supplied through channel 30 to the interior space 41 of housing 40. Piston 43 is again tightly arranged within housing 40 of gripper 4, so that the supplied underpressure causes movement of piston 43 from its distal end position (FIG. 7) to an intermediate position (FIG. 8) and finally to its proximal end position (FIG. 9). Movement of piston 43 from its distal end position to the intermediate position and finally to its proximal end position firstly causes the generation of suction in that portion of the interior space 41 located beneath piston 43. This suction causes the fins 110 of diaphragm 11 to be flexed away and make them rest against the walls of the conically inwardly tapering portion 401 of opening 400 (FIG. 8). Also, the movement of piston 43 towards its proximal end position causes the contact lens CL to be sucked through opening 400 together with an amount of liquid L into the interior space 41 of housing 40, as this becomes evident from FIGS. 7-9. However, screen 42 makes sure that the contact lens CL is retained beneath screen 42, that is to say in a partial space 410 of the interior space 41 of housing 40, that partial space 410 being arranged between screen 42 and opening 400.

As piston 43 has reached its proximal end position (FIG. 9), the gripper is removed from container 1 (not shown) with the underpressure being maintained, so that contact lens CL remains within the partial space 410 and immersed in liquid L. The gripper 4 can then be moved to the destination location, e.g. to a location where an inspection cuvette is arranged. Having reached its destination location, the underpressure is no longer maintained but overpressure is applied through common supply channel 30 instead. This causes piston 43 to move from its proximal end position (FIG. 9) towards its distal end position (FIG. 7). This movement of piston 43 causes positive pressure to be generated in partial space 410 resulting in that contact lens CL together with the liquid being released from the interior space 41, or from the partial space 410, respectively, through opening 400 at the distal end of housing 40. For example, contact lens CL together with the liquid L which may be water or any other suitable liquid is introduced into the inspection cuvette (not shown) for subsequent inspection of the contact lens CL.

The invention has been described with reference to the particular embodiments shown in FIGS. 1-9. However, for the skilled person it is evident that many changes and modifications can be made without departing from the general concept underlying the invention. By way of example, instead of providing a piston the underpressure can be directly applied to cause the suction, however, in this case it should be made sure that the liquid cannot enter the vacuum source providing the underpressure. The same holds for the overpressure which can be applied directly rather than causing the piston to move. Also, the presence of the screen or mesh material is generally optional although its presence is advantageous. A variety of further changes and modifications is conceivable. Therefore, the scope of protection is not intended to be limited to certain embodiments but rather is defined by the appended claims.

The invention claimed is:

1. A gripper for grasping an ophthalmic lens immersed in a liquid, the gripper comprising:
   a housing having an opening arranged at the distal end of the housing, the opening being in communication with an interior space defined by the housing and being sized to allow the ophthalmic lens to pass therethrough,
   a supply channel for generating underpressure in the interior space of the housing to allow the ophthalmic lens together with an amount of the liquid in which the ophthalmic lens is immersed to be sucked through the opening into the interior space of the housing, and
   a supply channel for generating overpressure in the interior space of the housing so as to allow the ophthalmic lens together with the amount of liquid to be released from the interior space through the opening at the distal end of the housing;

wherein the supply channel for generating underpressure and the supply channel for generating overpressure are in communication with the interior space of the housing at a proximal end portion of the housing; and further comprising a piston movably arranged in the interior space of the housing between a distal end position of the piston and a proximal end position of the piston.

2. The gripper according to claim 1, wherein the supply channel for supplying the underpressure and the supply channel for supplying the overpressure together form a common supply channel for supplying the underpressure or the overpressure through the common supply channel.

3. The gripper according to claim 2, further comprising a screen arranged in the interior space of the housing, the screen being arranged to retain the ophthalmic lens in the interior space of the housing on that side of the screen facing the opening at the distal end of the housing.

4. The gripper according to claim 2, wherein the housing at its distal end has a conical outer shape tapering towards the distal end.

5. The gripper according to claim 2, wherein the opening at the distal end of the housing comprises a conically inwardly tapering portion.

6. The gripper according to claim 1, wherein the supply channel for supplying the underpressure and the supply channel for supplying the overpressure are arranged to allow the underpressure or the overpressure to be supplied to the interior space of the housing at a location proximal to the proximal end position of the piston, so as to allow the piston to be moved towards its proximal end position upon supplying underpressure to cause the piston to generate the underpressure in the interior space of the housing and to allow the piston to be moved towards its distal end position upon supplying overpressure to cause the piston to generate the overpressure in the interior space of the housing.

7. The gripper according to claim 1, further comprising a screen arranged in the interior space of the housing, the screen being arranged to retain the ophthalmic lens in the interior space of the housing on that side of the screen facing the opening at the distal end of the housing.

8. The gripper according to claim 1, wherein the housing at its distal end has a conical outer shape tapering towards the distal end.

9. The gripper according to claim 1, wherein the opening at the distal end of the housing comprises a conically inwardly tapering portion.

10. A method for grasping an ophthalmic lens immersed in a liquid, the method comprising the steps of:
providing a gripper comprising a housing having an opening arranged at the distal end of the housing, the opening being in communication with an interior space defined by the housing and being sized to allow the ophthalmic lens to pass therethrough,
generating underpressure in the interior space of the housing causing the ophthalmic lens together with an amount of the liquid in which the ophthalmic lens is immersed to be sucked through the opening into the interior space of the housing, and generating overpressure in the interior space of the housing causing the ophthalmic lens together with the amount of liquid to be released from the interior space through the opening at the distal end of the housing; and wherein the gripper further comprises a piston movably arranged in the interior space of the housing between a distal end position of the piston and a proximal end position of the piston, wherein the step of generating underpressure in the interior of the housing comprises moving the piston towards its proximal end position, and wherein the step of generating overpressure in the interior of the housing comprises moving the piston towards its distal end position.

11. The method according to claim 10, further comprising the step of supplying underpressure or overpressure, respectively, to a proximal end portion of the interior space of the housing to generate the underpressure or the overpressure, respectively.

12. The method according to claim 10, wherein supplying underpressure to the proximal end portion of the interior space of the housing causes the piston to move towards its proximal end position and wherein supplying overpressure to the proximal end portion of the interior space of the housing causes the piston to move towards its distal end position.

13. The method according to claim 10, wherein the gripper further comprises a screen arranged in the interior space of the housing to retain the ophthalmic lens in the interior space of the housing on that side of the screen facing the opening at the distal end of the housing.

14. The method according to claim 10, wherein the ophthalmic lens prior to being grasped is arranged in the liquid in a container having an elongated tubular body, the container comprising a diaphragm having flexible fins extending from the tubular body towards the central axis of the body to retain the ophthalmic lens in the container, and wherein the housing of the gripper at its distal end has a conical outer shape tapering towards the distal end, the method further comprising moving the distal end of the gripper through the diaphragm to flex the fins away and make them rest against the conically shaped distal end of the housing prior to generating underpressure in the interior space of the housing.

15. The method according to claim 10, wherein the ophthalmic lens prior to being grasped is arranged in the liquid in a container having an elongated tubular body, the container comprising a diaphragm having flexible fins extending from the tubular body towards the central axis of the body, and wherein the opening at the distal end of the gripper comprises a conically inwardly tapering portion, the method further comprising moving the distal end of the gripper into the liquid in the container to a position close to the diaphragm and then generating the underpressure in the interior space of the housing to flex the fins and make them rest against the conically inwardly tapering portion to allow the lens to be sucked through the opening into the interior space of the housing.

* * * * *